Oct. 7, 1958   N. G. HORWITT   2,854,774
ADJUSTABLE PICTURE FRAME
Filed Dec. 31, 1956
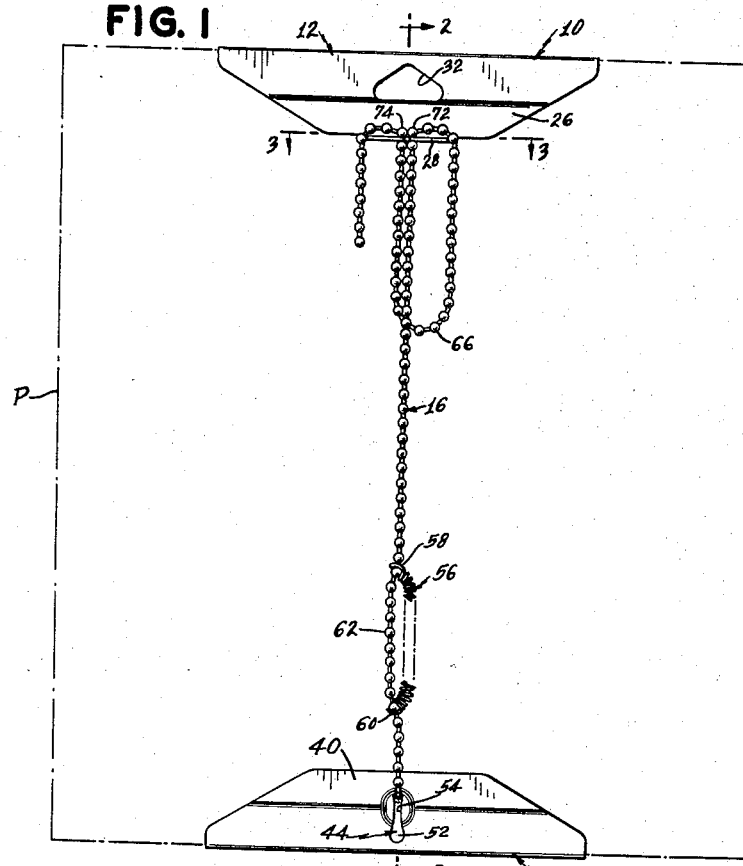
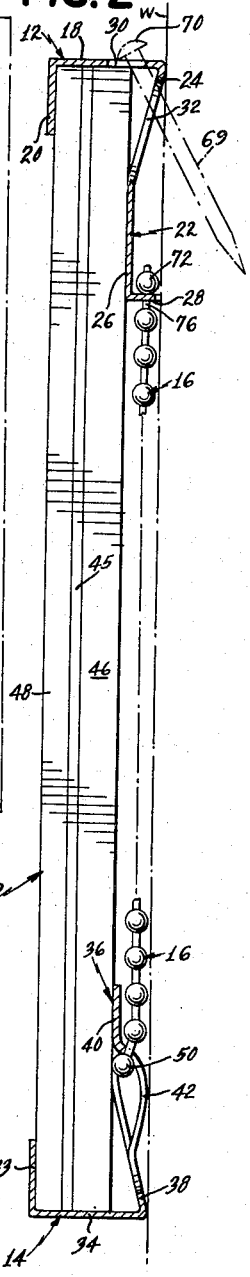
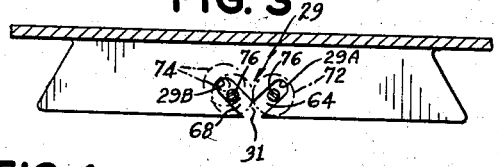
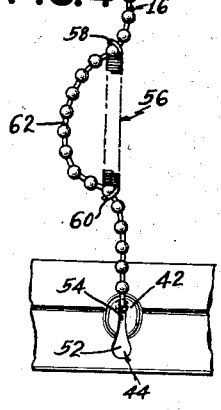
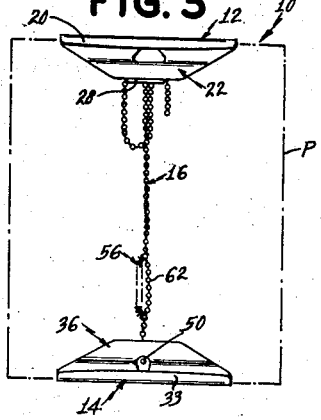
INVENTOR.
Nathan G. Horwitt
BY
ATTORNEYS United States Patent Office 2,854,774
Patented Oct. 7, 1958

2,854,774
ADJUSTABLE PICTURE FRAME
Nathan G. Horwitt, Lenox, Mass.
Application December 31, 1956, Serial No. 631,742
5 Claims. (Cl. 40—155)

The present invention relates generally to adjustable frames for supporting pictures, mirrors, plaques, or other similar objects.

Adjustable frames of the prior art have had the upper and lower frame members thereof interconnected by a spring, or by a cord or beaded chain in which a spring is included. With such an arrangement, the individual doing the framing, in his desire to have the maximum security for the picture by providing the maximum tension, may pull the chain too hard and wreck the spring even before the picture is framed. In addition, in the prior art arrangement, regardless of the height of the frame, the weight of the framed picture is transmitted directly to the spring so that if the spring stretches, the distance between the frame members is increased so that the frame becomes loose and the glass and other elements of the picture are not retained securely therebetween. Therefore, the primary object of the present invention is to obviate the foregoing disadvantages of prior art frames which include a spring member in tension between the upper and lower frame members.

In adjustable frames of the type with which the present invention is concerned, one end of the cord or beaded chain is usually secured to one of the frame members and, after the chain is pulled to provide the proper degree of tension for the frame, the chain is then secured to the other frame member to retain the chain in tension therebetween. It is another object of the present invention to provide a highly simple and yet efficient arrangement to lock the chain in said other frame member.

Another object is the provision of an adjustable frame which includes a spring member for retaining the upper and lower frame members in tension against the framed article and where provision is made for preventing initial damage to the spring or the tensioning of the spring by the weight of the framed article after the frame has been adjusted on the framed article.

Another object is to provide an inexpensive, simple and yet efficient frame for supporting articles of the described type.

The above and other objects, features and advantages of the present invention will be more fully understood from the following description considered in connection with the accompanying illustrative drawings.

In the drawings:

Fig. 1 is a rear view of a frame pursuant to the present invention, provided with a picture or the like;

Fig. 2 is a sectional view, taken on the line 2—2 of Fig. 1;

Fig. 3 is a fragmentary sectional view, on an enlarged scale, taken on the line 3—3 of Fig. 1;

Fig. 4 is a fragmentary view with the tensioning spring being shown in relaxed condition; and Fig. 5 illustrates a front view, on a greatly reduced scale, of a picture or similar object provided on the frame of the present invention.

Referring now to Figs. 1 through 5 of the drawings in detail, there is shown an adjustable frame, pursuant to the present invention, generally indicated by the reference numeral 10. Said frame comprises an upper frame member 12 and a lower companion frame member 14, said members being interconnected by the beaded chain 16 which is anchored in the lower frame member and which is releasably engaged with the upper frame member.

The upper frame member 12 is preferably formed of a spaced metallic channel shaped part. The part 12 has a web or bight portion 18 provided at the front thereof with a lip or flange 20 and provided at the rear thereof with the depending portion 22. The portion 22 is provided with a portion 24 which is inclined toward the front lip 20 and with a portion 26 which is parallel to the lip 20, the portion 26 being provided at its free marginal edge, and substantially centrally thereof with a rearwardly reflexed portion 28. The bight 18 is provided with an aperture 30 and the inclined portion 24 is provided with a substantially triangular opening 32 substantially centrally thereof and, as best illustrated in Fig. 3, the reflexed portion 28 is provided with a V-shaped slot 29 which is open at the apex 31 thereof.

The lower frame member 14 is also preferably formed of a stamped metallic part, being essentially channel shaped in cross section as best shown in Fig. 2. The part 14 is provided with the base or bight portion 34 which has a front lip or flange 33 and a rear flange 36. The rear flange 36 is provided with a portion 38 which is inclined toward the lip 33 and with a portion 40 which is substantially parallel to the lip 33. The flange 36 is pressed outwardly, as at 42 and is provided with a key shaped slot 44 which extends from the pressed out portion 42 into the inclined portion 38, as best illustrated in Fig. 2.

As here shown, a picture P or the like is positioned between the frame members 12 and 14. The composite picture P is constituted by a picture 45 which is sandwiched between a suitable backing member 46 and a sheet of glass 48, the glass being at the front thereof and the backing member 46 being at the rear thereof. The composite picture P is inserted between the frame members 12 and 14 with said frame members in said confronting relation, as illustrated in Fig. 2, the upper and lower ends of the composite picture P abutting the confronting bight portions 18 and 34, the glass member 48 abutting the inner surfaces of the lips 20 and 33 and the outer surface of the backing member 46 abutting portion 26 of flange 22 of the upper frame member 12 and portion 40 of flange 36 of the lower frame member 14.

The beaded chain 16 is utilized to secure the frame members 12 and 14 in tension against the abutting edges of the composite picture P. In this connection, it will be noted that the bottom bead 50 of the chain member 16, having been originally inserted into the lower enlarged portion 52 of the slot 44 is drawn upwardly into the narrowed slot portion 54 and is locked therein as best illustrated in Fig. 2. In this connection, it will be noted that the bead 50 is disposed in the offset portion 42 of the flange 36 clear of the backing member 46. Pursuant to an important feature of the present invention a tension spring 56 which as here shown is constituted by a closed spiral spring, is provided on the beaded chain 16. More specifically, the opposite end convolutions 58 and 60 of the spring 56 are each mounted between a pair of adjacent beads with the longitudinal extent of the chain portion 62 between the opposite ends of the spring 56 exceeding the longitudinal extent of the spring in the relaxed condition of the latter. Consequently, it will be apparent that the tensioning of the spring 56 from the relaxed condition thereof (Fig. 4) is limited by the chain portion 62 which is bridged thereby. In adjusting the length of the chain 16 to the height of the picture P, the chain is pulled sufficiently at a point above the spring 56 to tension the latter, as best illustrated in Fig. 1, the chain then being inserted, while retained in said tensioned condition thereof into the opening 31 of the V-shaped slot 29 and moved into the slot portion 64 thereof. As best noted from Fig. 3, the width of the slot portion 64 is less than the diameter of the beads of the chain 16 so that the chain is retained in tension when inserted into the slot 29, with the spring 56 tensioned as required when the chain is stretched to adjust the latter to the height of the picture so that the frame members 12 and 14 will be resiliently engaged or tensioned against the upper and lower ends of the picture P as illustrated in Fig. 2. The excess portion of the chain is then looped as indicated at 66 in Fig. 1 about the ends of flange 28 and is inserted into the other slot portion 68 as best illustrated in Fig. 3.

In order to mount the frame on a wall or the like, a nail 69 is forced into the wall W with the head 70 of the nail extending for a predetermined distance outwardly of the wall. The framed picture may then be conveniently suspended on the nail by hanging the picture thereon so that the nailhead 70 extends through the triangular opening 32 in the flange 22 and projects through the aperture 30 in the bight 18. In this connection, it will be noted that sufficient clearance is provided for the nail, rearwardly of the picture P due to the inclined portion 24 of the flange 22.

With the picture mounted on the wall, as illustrated in Fig. 1 it will be apparent that the weight thereof will be carried by the lower frame member 14. However, with the spring 56 tensioned to the maximum condition thereof permitted by the chain portion 62, as illustrated in Fig. 1 it will be apparent that the lower frame member 14 will not be permitted to move downwardly relative to the upper frame member 12 and therefore the frame 10 will not be loosened on the picture.

The V-shaped slot 29 is dimensioned relative to the beads of chain 16 to provide a self-locking action when the chain is inserted therein, as best shown in Fig. 3. More specifically, it will be noted that neither the bead 72, which is subject to the tension of spring 56, nor the bead 74 of the loop portion 66 can pass outwardly of the apex opening 31 of the slot since their diametrical dimensions are such that each prevents movement of the other toward the slot opening 31, to provide a locking action. However, the individual slot segments 29A and 29B are so dimensioned that if one of said beads is moved toward the closed end of the associated slot so that its associated bead linking element 76, which extends through the slot, abuts the closed end of the associated slot, then the other bead is cleared to move outwardly of the slot opening 31. More specifically, with the link 76 in slot 29B in the broken line position thereof against the closed end of slot 29B, bead 74 is retracted sufficiently out of the path of movement of bead 72 to permit the link 76 of the latter to move out through the open end 31 of the slot.

In view of the foregoing, it will be apparent that provision is made pursuant to the present invention, for a captive spring 56 on the chain 16 which can not be damaged as a result of excess pull on the chain during the framing of the picture and which, being captive, will not stretch beyond the amount permitted by the chain portion 62 so as to prevent loosening of the framed picture due to the weight thereof. Furthermore, the present invention provides for a simple and efficient chain locking arrangement constituted by the V-shape slot 29.

While I have shown and described the preferred embodiments of my invention, it will be understood that various changes may be made in the present invention without departing from the underlying idea or principles of the invention, within the scope of the appended claims.

Having thus described my invention, what I claim and desire to secure by Letters Patent, is:

1. A frame of the character described, comprising a pair of frame members adapted to engage opposite edges, respectively, of an article engaged therebetween, a flexible and inextensible member adjustably interconnecting said frame members to draw them together into said engagement with the framed article, said interconnecting member being releasably secured at one end thereof to one of said frame members and being releasably engageable with the other of said frame members for drawing said frame members together against said opposite edges of the picture, and resilient means having its opposite ends fixedly secured to said interconnecting member so as to bridge a predetermined fixed length portion of the latter which extends between the points of securement of said tension means to said interconnecting member, the extent of said predetermined fixed length portion along the length of said interconnecting member exceeding the similar extent of said resilient means in the relaxed condition of the latter, whereby the stressing of said tension means is limited by said bridged portion.

2. A frame of the character described, comprising a pair of frame members adapted to engage opposite edges, respectively, of an article engaged therebetween, a flexible and inextensible member adjustably interconnecting said frame members to draw them together into said engagement with the framed article, said interconnecting member being releasably secured at one end thereof to one of said frame members and being releasably engageable with the other of said frame members for drawing said frame members together against said opposite edges of the picture, and a tension spring having its opposite ends secured to said interconnecting member to bridge a predetermined fixed length intermediate portion of the latter, the extent of said intermediate portion along the length of said member exceeding the similar extent of said spring in the relaxed condition of the latter, whereby the tensioning of said spring is limited by the extent of said intermediate portion.

3. A frame of the character described, comprising an upper and lower frame member adapted to engage opposite edges, respectively, of an article engaged therebetween for mounting said article in the frame, a flexible and inextensible member adjustably interconnecting said frame members to draw them together into said engagement with the framed article, each of said frame members having front and rear parts spaced from each other to receive a marginal edge portion of the article therebetween, the rear part of one of said frame members being provided with a rearwardly extending portion having a locking formation comprising an open ended V-slot having rearwardly converging slot portions, the rear part of the other of said members being provided with a locking slot, said flexible member having one end portion thereof releasably locked in said locking slot of said other member and having a releasable and adjustable holding engagement directly with said rearwardly extending portion on said one frame member, said open ended V-slot receiving a portion of said interconnecting member in each slot portion thereof whereby said portions are in side by side disposition for converging movement toward the open end of said V-slot and whereby each portion prevents the passage of the other portion through said open end.

4. A frame of the character described, comprising an upper and lower frame member adapted to engage opposite edges, respectively, of an article engaged therebetween for mounting said article in the frame, a flexible and inextensible member adjustably interconnecting said frame members to draw them together into said engagement with the framed article, each of said frame members having front and rear parts spaced from each other to receive a marginal edge portion of the article therebetween, the rear part of one of said frame members being provided with a rearwardly extending portion having a locking formation comprising an open ended V-slot having rearwardly converging slot portions, the rear part of the other of said members being provided with a locking slot, said flexible member having one end portion thereof releasably locked in said locking slot of said other member and having a releasable and adjustable holding engagement directly with said rearwardly extending portion on said one frame member, said open ended V-slot receiving a portion of said interconnecting member in each slot portion thereof whereby said portions are in side by side disposition for converging movement toward the open end of said V-slot and whereby each portion prevents the passage of the other portion through said open end, said interconnecting member comprising a beaded chain, and a tension spring having its opposite ends secured to said chain to bridge a predetermined fixed length intermediate portion of the latter, the extent of said intermediate portion along the length of said chain exceeding the similar extent of said spring in the relaxed condition of the latter, whereby the tensioning of said spring is limited by the extent of said intermediate portion.

5. A frame for supporting a picture or the like comprising an upper and a lower channel frame member each having a web adapted to engage an edge of the picture and opposing front and rear flanges extending therefrom for engagement with the front and rear surfaces, respectively, of the picture, said rear flanges being inclined toward the associated front flanges, a flexible elongated member interconnecting said frame members to draw them together against the opposite edges, respectively, of the picture, said lower frame member having means defined in the rear flange thereof in which to releasably lock one end of said interconnecting member, said upper frame being provided with a portion extending rearwardly from upper member rear flange, said portion having a locking formation comprising an open ended V-slot having rearwardly converging slot portions for releasable and adjustable engagement with said interconnecting member for urging said frame members into engagement with the picture held therebetween, each slot portion of said V-slot receiving a portion of said interconnecting member whereby said portions are in side-by-side disposition for converging movement toward the open end of said V-slot and whereby each portion prevents the passage of the other portion through said open end, said upper frame member also having apertures defined in the web and rear flange thereof to accommodate a frame suspending device clear of the picture.

References Cited in the file of this patent
UNITED STATES PATENTS

| | | |
|---|---|---|
| 238,807 | Phillips | Mar. 15, 1881 |
| 2,209,972 | Horwitt | Aug. 6, 1940 |
| 2,242,804 | Trowbridge | May 20, 1941 |